United States Patent
Cattoor et al.

(10) Patent No.: US 12,337,679 B2
(45) Date of Patent: Jun. 24, 2025

(54) ELECTRIC DRIVE UNIT AND METHOD FOR DRIVE UNIT OPERATION

(71) Applicant: Dana Belgium N.V., Flanders (BE)

(72) Inventors: Kurt Cattoor, Koolkerke (BE); Filip D. Schacht, Meulebeke (BE)

(73) Assignee: DANA BELGIUM N.V., Bruges (BE)

( * ) Notice: Subject to any disclaimer, the term of this patent is extended or adjusted under 35 U.S.C. 154(b) by 193 days.

(21) Appl. No.: 18/185,146

(22) Filed: Mar. 16, 2023

(65) Prior Publication Data
US 2024/0308332 A1    Sep. 19, 2024

(51) Int. Cl.
*B60K 1/02* (2006.01)
*B60K 17/344* (2006.01)
*B60L 15/20* (2006.01)
*F16H 57/04* (2010.01)
*F16H 61/32* (2006.01)

(52) U.S. Cl.
CPC .............. *B60K 17/344* (2013.01); *B60K 1/02* (2013.01); *B60L 15/2054* (2013.01); *F16H 57/0436* (2013.01); *F16H 57/0484* (2013.01); *F16H 61/32* (2013.01); *B60L 2220/10* (2013.01); *F16H 2061/323* (2013.01); *F16H 2200/0017* (2013.01); *F16H 2200/0021* (2013.01); *F16H 2200/0034* (2013.01); *F16H 2200/2005* (2013.01); *F16H 2200/2035* (2013.01)

(58) Field of Classification Search
CPC ............... B60K 1/02; F16H 2200/2005; F16H 2200/2035; F16H 2200/0034
See application file for complete search history.

(56) References Cited

U.S. PATENT DOCUMENTS

| | | | |
|---|---|---|---|
| 7,206,204 B2 | 4/2007 | Nakatsu et al. | |
| 8,582,291 B2 | 11/2013 | Nakasaka et al. | |
| 8,885,344 B2 | 11/2014 | Asakura et al. | |
| 9,242,555 B2 | 1/2016 | Wenthen | |
| 9,637,127 B1 * | 5/2017 | Cooper | B60W 10/115 |
| 9,950,607 B2 | 4/2018 | Littlefield et al. | |
| 10,144,309 B2 | 12/2018 | Leng et al. | |
| 10,600,721 B2 | 3/2020 | Machler et al. | |
| 11,383,597 B2 | 7/2022 | Kumar et al. | |
| 2010/0180722 A1 | 7/2010 | Sasaki | |

(Continued)

FOREIGN PATENT DOCUMENTS

| | | | |
|---|---|---|---|
| AT | 522613 A1 | 12/2020 | |
| CN | 210760229 U | * 6/2020 | |

(Continued)

*Primary Examiner* — Ernesto A Suarez
*Assistant Examiner* — Lillian T Nguyen
(74) *Attorney, Agent, or Firm* — McCoy Russell LLP

(57) ABSTRACT

Systems and methods for an electric drive unit. The electric drive unit, in one example, includes a first motor and a second motor arranged parallel to each other and rotationally coupled to a first input gear that is fixedly coupled to a first transmission shaft and a first clutch arranged coaxial to a second clutch. The drive unit further includes a second transmission shaft with an output gear rotationally coupled thereto and including a first and second mechanical interface configured to rotationally couple to a first drive axle and a second drive axle, where the output gear meshes with a gear that is directly rotationally coupled to a carrier in a planetary gear set.

15 Claims, 7 Drawing Sheets

(56) References Cited

U.S. PATENT DOCUMENTS

| | | |
|---|---|---|
| 2010/0267508 A1 | 10/2010 | Hvolka et al. |
| 2011/0024222 A1 | 2/2011 | Honzek |
| 2014/0116201 A1* | 5/2014 | Spiegel .............. B60L 15/2036 74/661 |
| 2015/0151634 A1 | 6/2015 | Smetana |
| 2016/0093788 A1 | 3/2016 | Matsumoto et al. |
| 2017/0023114 A1* | 1/2017 | Wang ..................... B60K 1/00 |
| 2018/0180500 A1* | 6/2018 | Hawarden ......... H04B 10/0775 |
| 2019/0344660 A1* | 11/2019 | Kumar ................... B60K 17/04 |
| 2021/0086558 A1* | 3/2021 | Baillie ................ B60B 35/122 |
| 2021/0237566 A1* | 8/2021 | Chopra ............... B60K 17/046 |
| 2022/0258592 A1 | 8/2022 | Schneidewind et al. |
| 2024/0011559 A1* | 1/2024 | Mori ....................... F16H 3/54 |
| 2024/0125088 A1* | 4/2024 | Barngrover ............ E02F 9/207 |

FOREIGN PATENT DOCUMENTS

| | | |
|---|---|---|
| CN | 217539492 U | 10/2022 |
| DE | 102020109116 B3 | 9/2021 |
| WO | 2019160957 A1 | 8/2019 |

* cited by examiner

ELECTRIC DRIVE UNIT AND METHOD FOR DRIVE UNIT OPERATION

TECHNICAL FIELD

The present disclosure relates to an electric drive unit with multiple electric motors and a method for operation of the electric drive unit.

BACKGROUND AND SUMMARY

Electric vehicles make use of electric drive units to generate motive power and provide an attractive alternative in terms of hydrocarbon emissions in relation to vehicles that solely rely on internal combustion engines for propulsion. Certain electric drive units have used multi-speed gearboxes to increase the unit's available gear ratios. Further, dual-motors have been utilized in some electric drive units to increase the drive unit's power output and adaptability.

U.S. Pat. No. 10,144,309 B2 to Leng et al. discloses a dual-motor drive unit for an all-electric vehicle. The dual motor drive unit includes two motors that are coaxially arranged with a synchronizer. Further, in Leng's drive unit, a shaft, which functions as an output for a differential, includes three gears positioned thereon.

The inventors have recognized several drawbacks with Leng's dual motor drive unit as well as other previous electric drive units. For instance, Leng's drive unit may be incompatible in certain vehicles that demand multiple drive axle interfaces with a comparatively short flange to flange distance, such as all-wheel drive loaders, due to the packaging constraints of surrounding vehicle systems. Further, due to the layout of the synchronizer and associated gear reductions on downstream shafts, the width of Leng's drive unit may not meet packaging demands of some vehicles. Other dual-motor electric drive systems have been unable to meet packaging demands in certain vehicles, specifically with regard to drop and width.

Facing the abovementioned issues, the inventors developed a multi-speed electric drive unit to at least partially overcome at least a portion of the issues. The electric drive unit, in one example, includes a first motor and a second motor that are arranged parallel to each other and rotationally coupled to a first input gear that is fixedly coupled to a first transmission shaft. The electric drive unit further includes a first clutch that is arranged coaxial to a second clutch. Further, in such an example, the first clutch selectively rotationally couples a carrier of a planetary gear set to the first transmission shaft and the second clutch selectively brakes a ring gear of the planetary gear set. The electric drive unit further includes a second transmission shaft with an output gear which is rotationally coupled thereto. The second transmission shaft includes a first and a second mechanical interface configured to rotationally couple to a first drive axle assembly and a second drive axle assembly. Further, in the drive unit, the output gear meshes with a gear that is directly rotationally coupled to the carrier. In this way, the electric drive unit achieves a desired energy and space efficiency (particularly with regard to drive unit width and drop) and range of shiftable gear ratios. The electric drive unit is additionally capable of driving multiple vehicle axle assemblies. As a result, the drive unit's customer appeal and applicability is expanded.

Further, in one example, the output gear may be positioned axially between the first input gear and the first and second clutches. Positioning the output gear in this manner enables the output gear and associated componentry to achieve a relatively small width which allows the drive unit to be packaged in spaced constrained vehicle platforms such as loaders, in one use-case example.

Still further, in one example, the electric drive unit may further include a third electric motor rotationally coupled to a second input gear that is fixedly coupled to the first transmission shaft. In such an example, the first input gear and the second input gear may be positioned on opposing ends of the first transmission shaft. Deploying a third electric motor in the electric drive unit allows the electric drive unit to provide enough tractive effort at stall to load a bucket of a loader and to achieve a target top speed and speed on ramp, for instance. The three motor layout is effective for electric motor selection even if relatively high total power for a transmission is demanded. This electric motor architecture enables a comparatively low cost motor solution to be achieved, if desired.

In another example, the electric drive unit may further include a scavenger pump with a pick-up positioned at vertical low point of a housing. In this way, splash losses in the transmission are reduced, further increasing transmission efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric drive unit that achieves a desired balance of space efficiency, drop, output width, and gear selection is described herein. To achieve the balance between these characteristics, the electric drive unit includes at least two electric motors which are arranged parallel to one another and coupled to an idler shaft. To elaborate, a ratio may be created between the electric motors and a lower speed clutch, with an idler shaft in between, to reduce the delta-speed in the drive unit's clutches, and thus reducing the drag loss. The electric drive unit further includes an output gear that meshes with a gear which is directed coupled to a carrier of a planetary gear set. In this way, the output gear and associated components are able to achieve a target compactness (e.g., output flange-to-flange distance) and meet the packaging demands of a variety of space constrained vehicle platforms, such as loaders, trucks, and the like. In the electric drive unit, two clutches are coupled to components in the planetary gear set and positioned coaxial to one another to allow the drive unit's operating gear to be changed in a space efficient package. Further, in one example, the electric drive unit may further include a third electric motor that is coupled to the idler shaft. Using three motors in the drive unit allows the drive unit to provide enough tractive effort at stall to load the bucket of a loader and to provide targets with regard to top speed and speed on ramp, in one exemplary scenario. Further, the three motor architecture is effective in vehicle platforms with a comparatively high total power demand.

Figure 1:
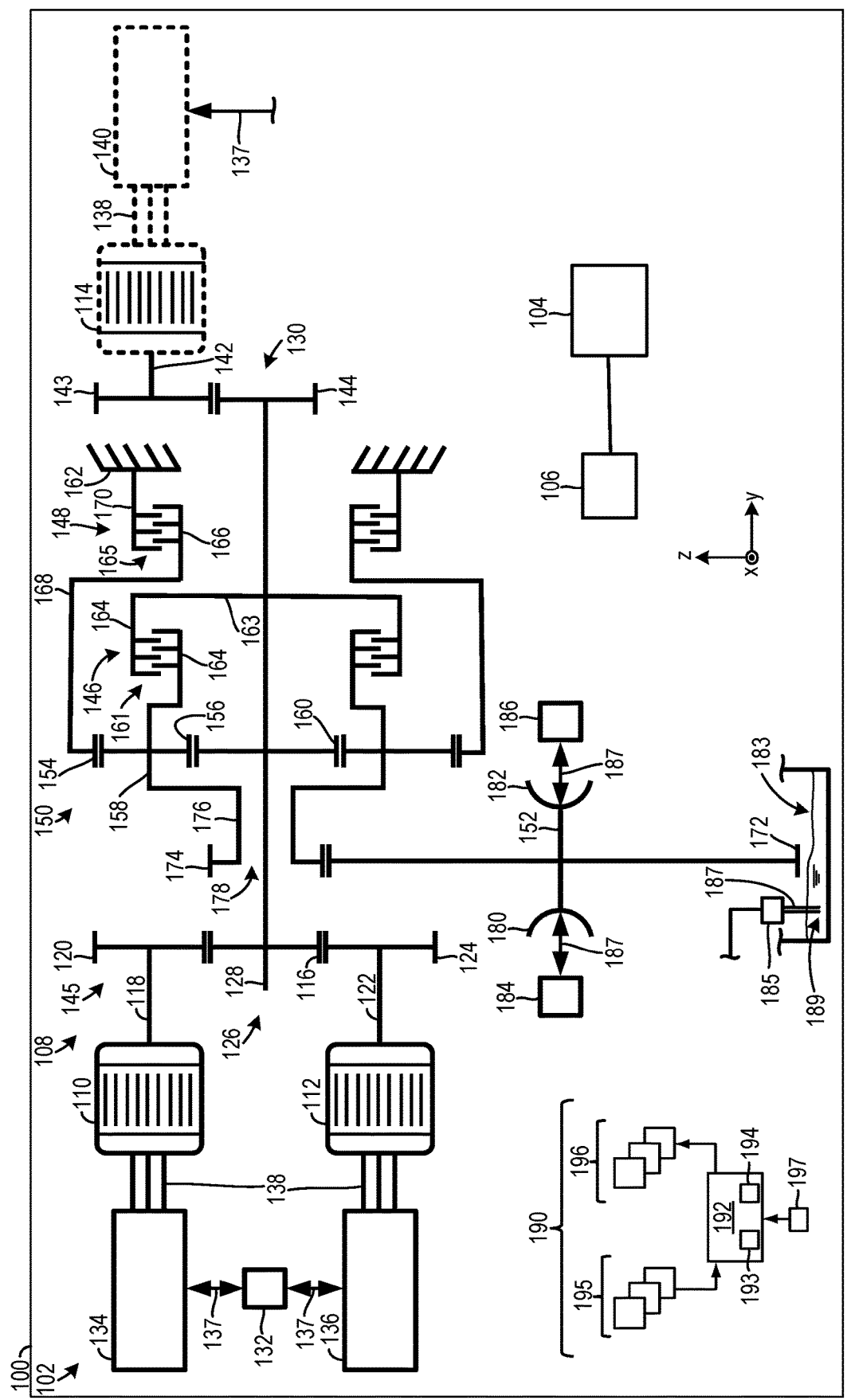
FIG. 1 shows a schematic depiction of an electric drive unit in an electric vehicle (EV).
Figure 2A:
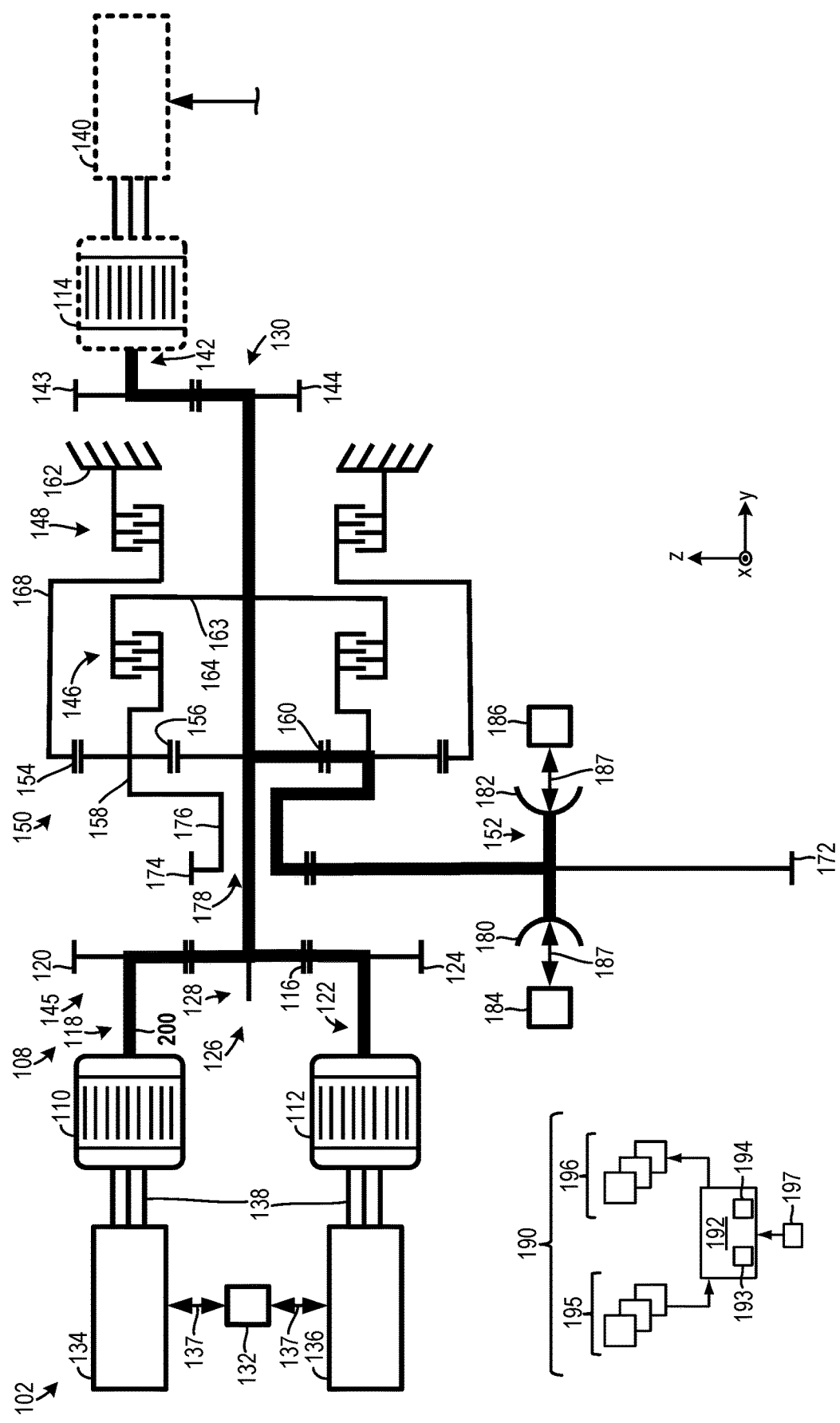
FIGS. 2A and 2B show mechanical power paths that occur in the electric drive unit, depicted in FIG. 1, in a lower speed mode and a higher speed mode, respectively.
Figure 2B:
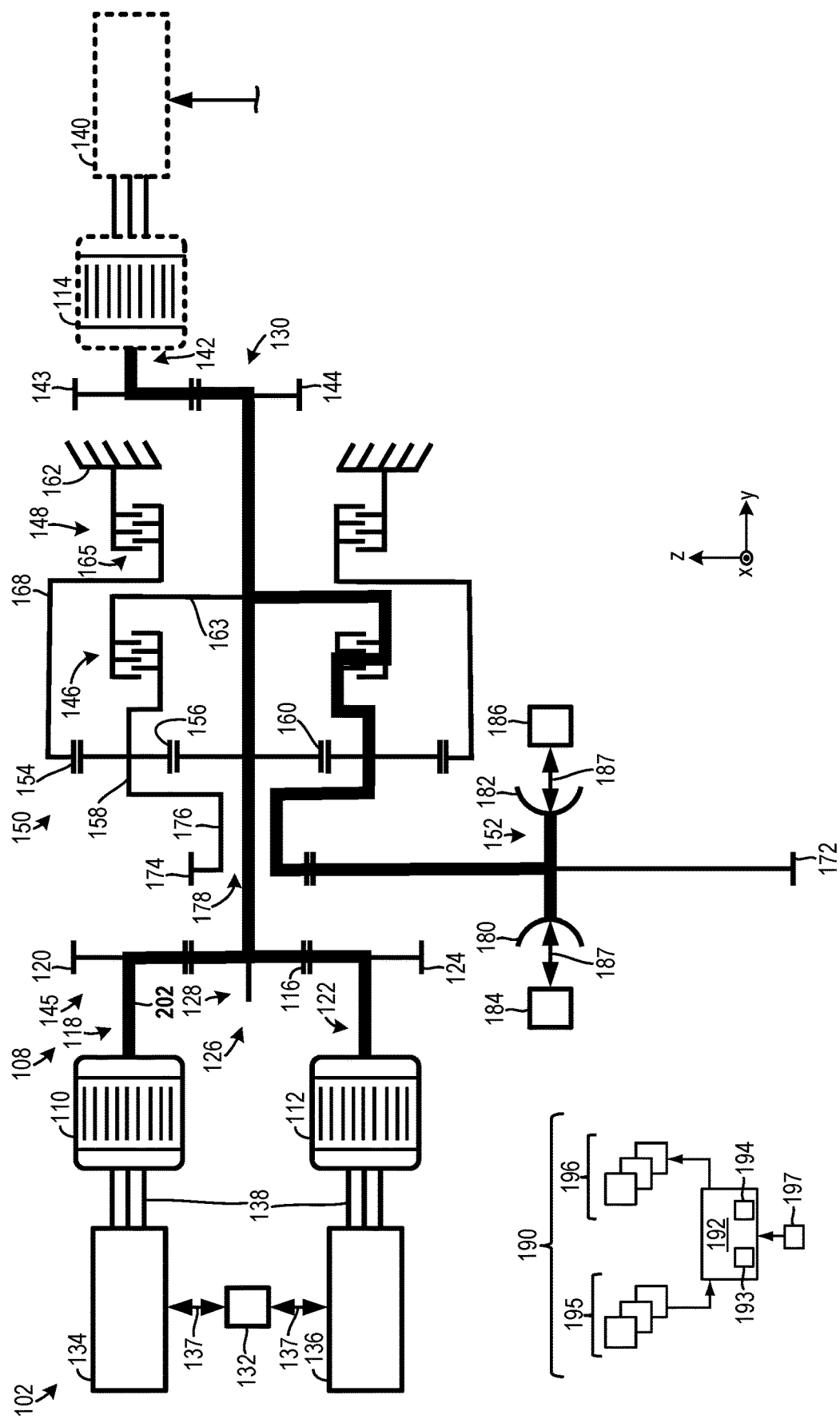
Figures 2C, 3:
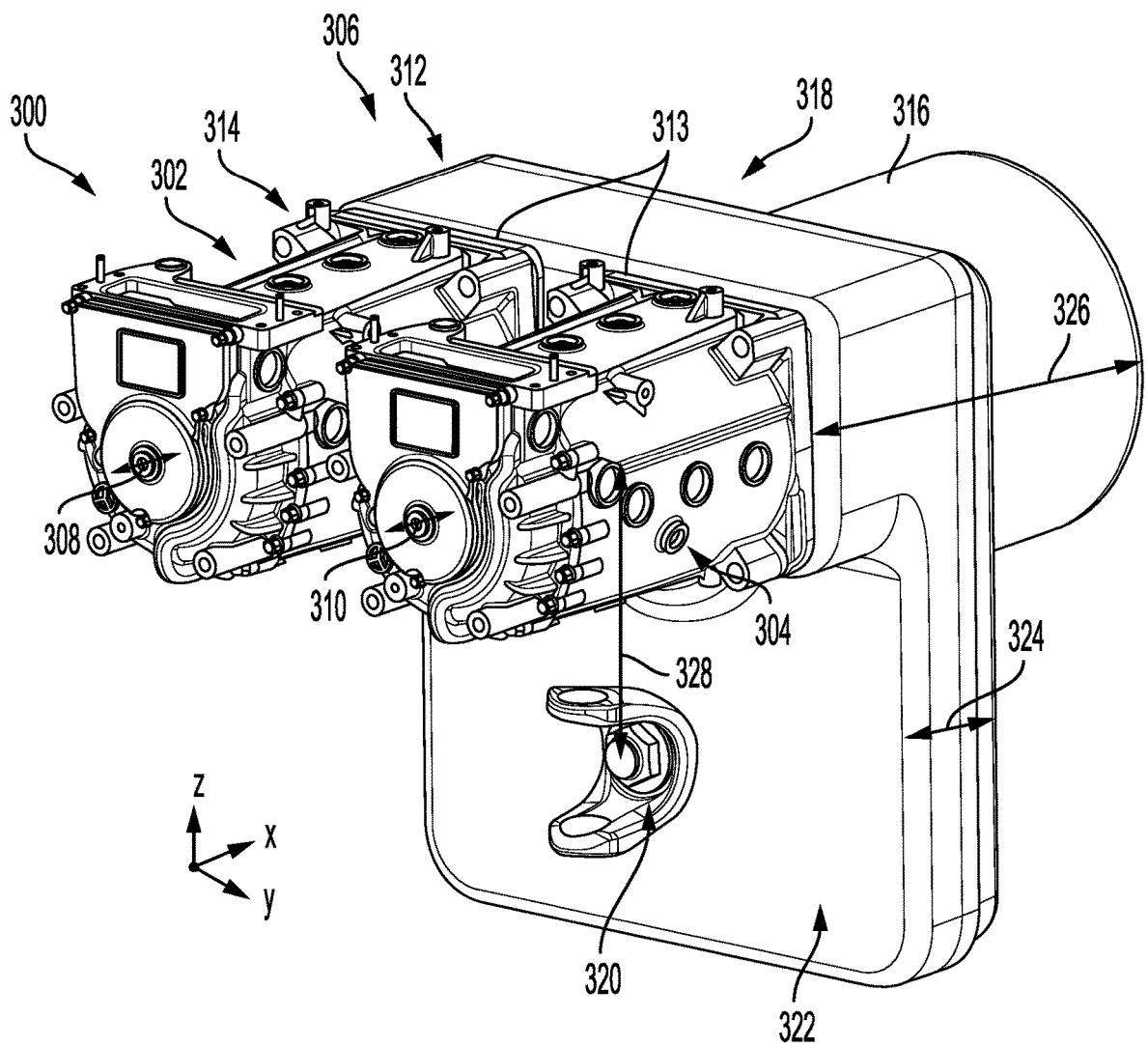
FIG. 2C shows a table with clutch positions and operational gear modes.
FIG. 3-4 show different perspective views of an exemplary electric drive unit.
Figure 4:
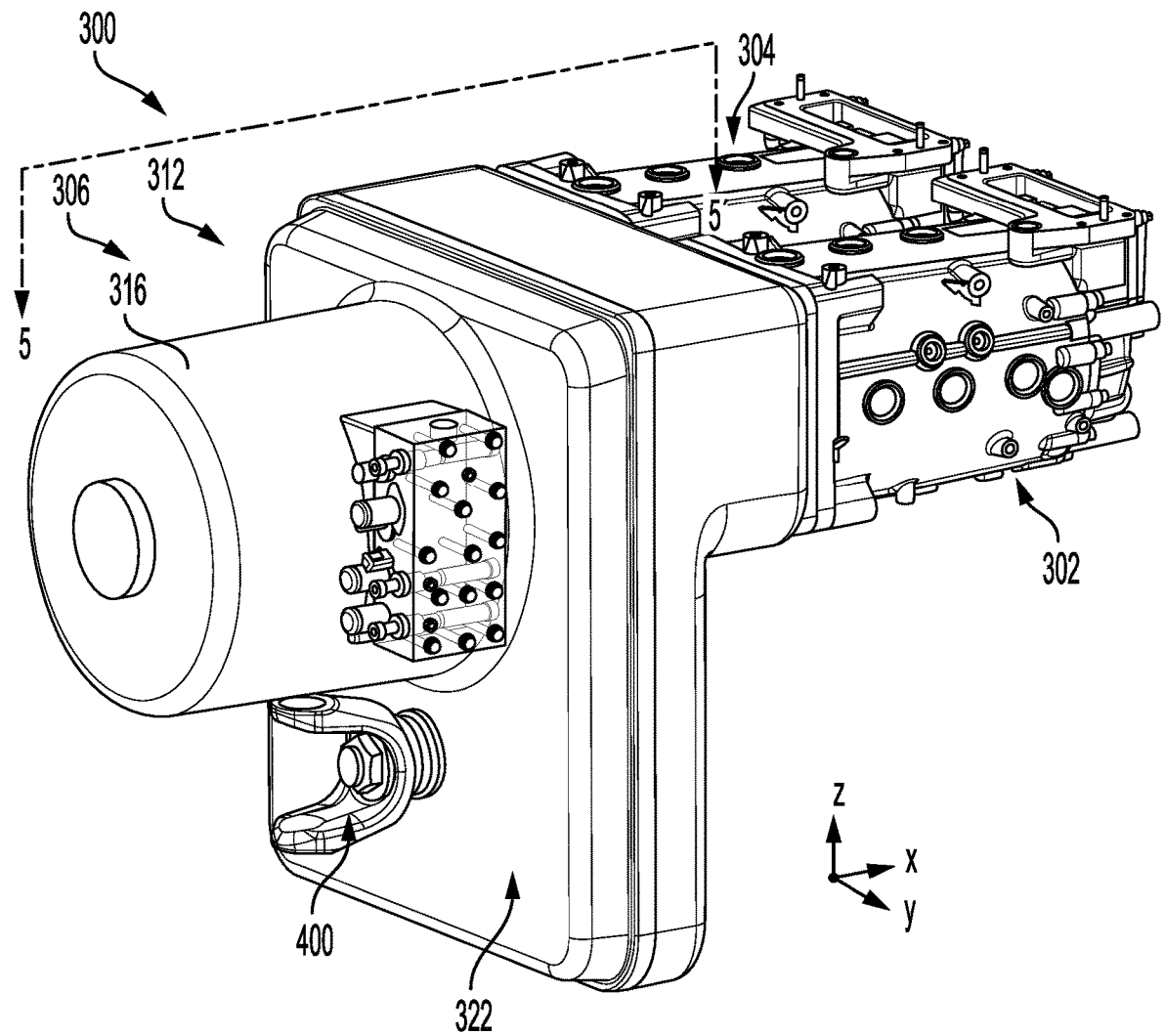
Figure 5:
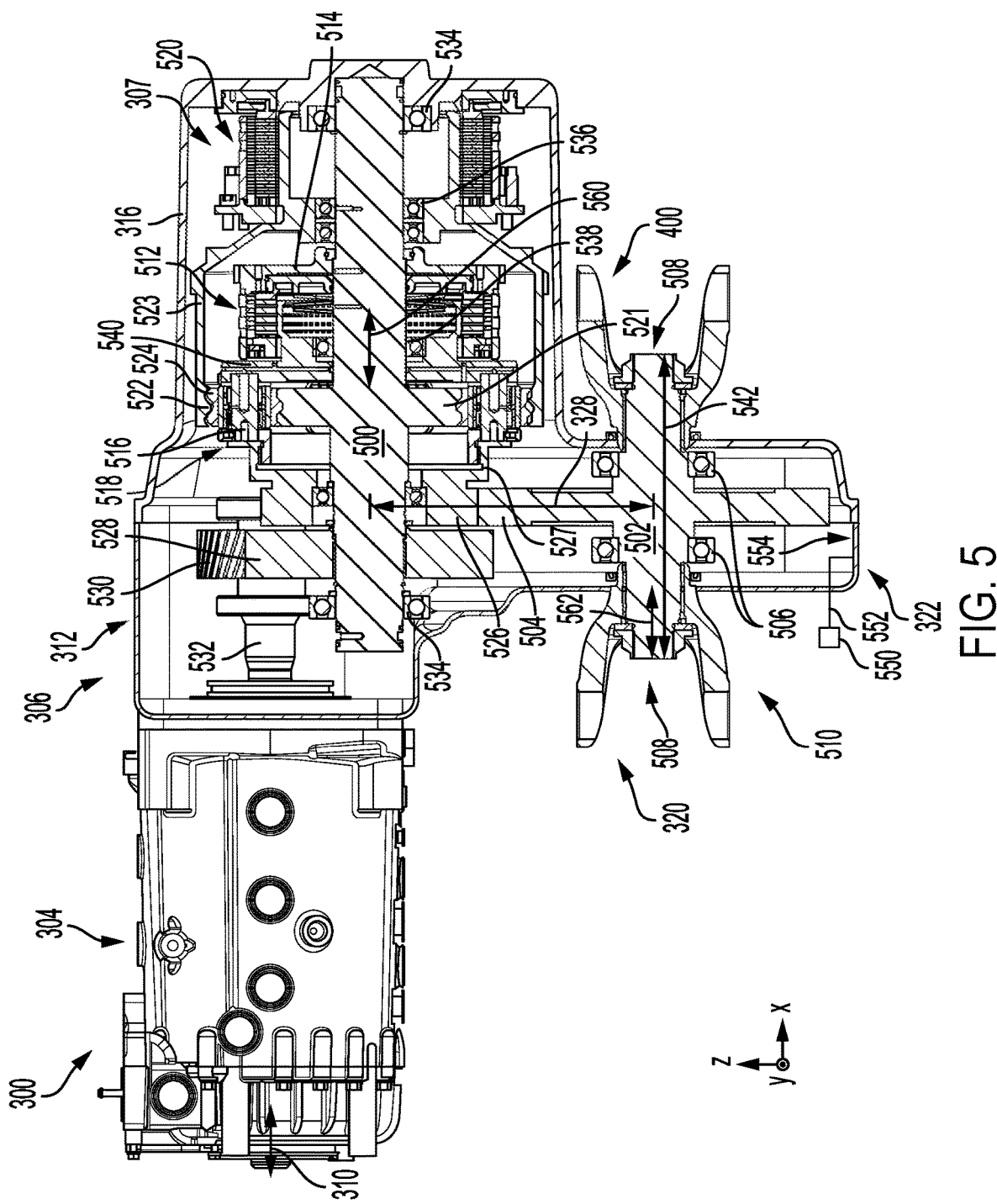
FIG. 5 shows a cross-sectional view of the electric drive unit, depicted in FIGS. 3-4.
Figure 6:
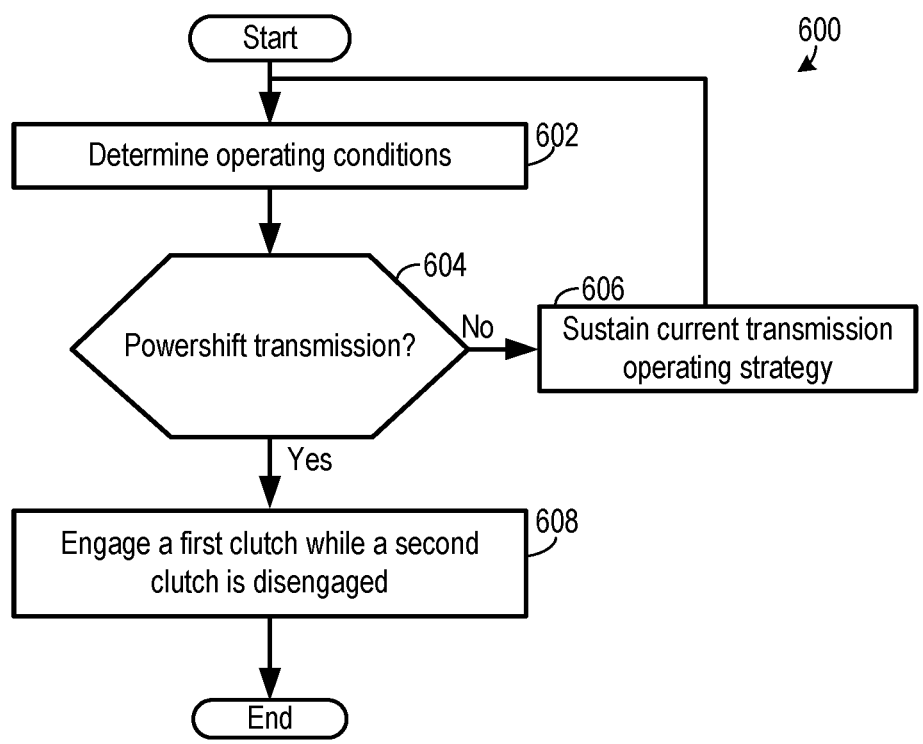
FIG. 6 shows a method for operation of an electric drive unit.

FIG. 1 is a schematic line drawing of a multi-speed and multi-motor electric drive unit that achieves a desired efficiency and operational cost and range, consequently, in a compact package. FIGS. 2A and 2B show the mechanical power paths that occur in a lower speed mode (e.g., first gear mode) and a higher speed mode (e.g., second gear mode), which enable the unit's gear ratio adaptability to be expanded. FIG. 2C shows a table with clutch configuration mapped to gear ratio. FIGS. 3, 4, and 5 show an example of a multi-motor electric drive unit with a space efficient output assembly that is designed to attach to multiple drive axle assemblies. FIG. 6 shows a method for effectively power-shifting an electric drive unit.

FIG. 1 depicts an electric vehicle (EV) 100 with a multi-speed electric drive unit 102 that generates motive power for vehicle propulsion. The EV 100 may be a light, medium, or heavy duty vehicle. Specifically, in one use-case example, the vehicle may be a loader type vehicle with a bucket 104 that is designed to scoop loose material in industrial, agricultural, or construction environments. The bucket 104 may be drive via a hydraulic, pneumatic, and/or electromechanical system 106. The electric drive unit 102 may be particularly useful in loader type vehicle due to its comparatively long drop and short output flange-to-flange (discussed in greater detail herein) which may be desirable in loader vehicles. However, in other examples, the EV 100 may be another suitable type of commercial vehicle such as a truck. Still further in other examples, the EV may be a passenger vehicle such as a truck, sedan, wagon, and the like. Further, the EV 100 may be a battery electric vehicle (BEV), in one example, or a hybrid electric vehicle (HEV) that includes an internal combustion engine, in another example.

The multi-speed electric drive unit 102 includes a transmission system 108, a first electric motor 110, and a second electric motor 112. The electric motors may specifically be traction motors such as traction motor-generators. The use of the dual-motors in the electric drive unit therefore enables the unit to attain end-use performance goals. As illustrated, the electric motors 110 and 112 are arranged parallel to one another. To elaborate, the motors may be positioned at similar height in the transmission housing, in one example. Arranging the electric motors in this manner enables the electric drive unit to achieve a desired weight distribution and axial separation between the machines for efficient packaging within the vehicle. However, other electric motors arrangements may be used, in other examples. For instance, the electric motors may be coaxially arranged, in other examples. Further, the parallel motor architecture in the electric drive unit allows the motors to deliver a target power to the system.

The multi-speed electric drive unit 102 further includes another electric motor 114, in the illustrated example. However, the third motor may be omitted in other architectures. For instance, the vehicle's end-use design parameters may demand a smaller longitudinal width of the drive unit than the three motor configuration is capable of. Using a third electric motor enable the performance of the drive unit to be increased. Further, using a third motor decreases the likelihood of drive unit inoperability.

The first electric motor 110 is rotationally coupled (e.g., directly rotationally coupled) to an input gear 116 via a shaft 118 and a gear 120. To elaborate, the input gear 116 meshes with the gear 120. As discussed herein, coupling between gears involves meshing between gear teeth. The shaft 118 is directly coupled to the motor's rotor shaft and the gear 120 is rotationally coupled to the shaft 118. This rotational componentry coupling as well as the other rotational coupling between components may be achieved via machining the gear into shaft or otherwise integrally forming the gear on the shaft, press fitting the gear on the shaft, splining the gear to the shaft, welding the gear to the shaft, combinations thereof, and the like. Likewise, the second electric motor 112 is rotationally coupled (e.g., directly rotationally coupled) to the input gear 116 via a shaft 122 and a gear 124.

The input gear 116 is positioned on one axial end 126 of a transmission shaft 128. In the illustrated three motor architecture, another input gear is positioned on another axial end 130 of the shaft 128. The axial ends 126, 130 of the shaft 128 are opposing axial ends.

The electric motors 110, 112 may be designed to provide a desired amount of tractive effort at stall to load the bucket 104 and a desired top speed and speed on a ramp, if wanted. The bucket 104 may be hydraulically operated, in one example. The hydraulics controlling the bucket may therefore be pressurized via an electric pump, in such an example.

Each of the electric motors 110, 112, 114 may include components such as rotors and stators that electromagnetically interact during operation to generate motive power. Further in one example, the electric motors may be motor-generators which are designed to generate electrical energy during regeneration operation. Still further, the electric motors may have similar designs and sizes, in some instances. In this way, manufacturing efficiency may be increased. However, the electric motors may have different sizes and/or designs, in alternate examples.

The electric motors 110, 112, 114 may be electrically coupled to one or more energy storage device(s) 132 (e.g., one or more traction batteries, capacitor(s), fuel cell(s), combinations thereof, and the like) by way of inverters 134, 136, 140, respectively, when the machines are designed as alternating current (AC) machines. Arrows 137 denote the electrical connections between the inverters 134, 136, 140 and the energy storage device(s) 132. Lines 138 indicate the electric connections which are established between the electric motors 110, 112, 114 and the inverters 134, 136, 140. These inverters and the other inverters described herein are designed to convert direct current (DC) to AC and vice versa. In one use-case example, the electric motors 110, 112, and/or 114 and/or the inverters 134, 136, and/or 140 may be multi-phase devices (e.g., three-phase devices) which can achieve greater efficiency when compared to other types of motors. As such, the electric motors may be multi-phase AC motors, in one example. However, motors and inverters designed to operate using more than three phases have been envisioned.

The electric motor 114 is coupled to the transmission shaft 128 via a shaft 142 (which is directly coupled to the motor's rotor shaft), a gear 143, and a gear 144 which is fixedly coupled to the transmission shaft 128.

Further, the transmission system 108 contains a multi-speed transmission 145 (e.g., a two-speed transmission) with a first clutch 146 and a second clutch 148 which are arranged coaxial to one another. The coaxial arrangement of the clutches allows the transmission achieve desired packaging targets particularly when used in conjunction with a planetary gear set 150 (e.g., a simple planetary gear set). Specifically, positioning the clutches coaxial to one another allows the clutches to be positioned at a desired height within the transmission housing. Further, the clutches 146 and 148 are spaced away but positioned parallel to a transmission shaft 152 (e.g., an output shaft), in the illustrated example. In this way, the multi-speed transmission is able to achieve a drop that meets packaging demands in certain loader type vehicles. However, the clutches and output shaft may have an alternate layout, in other examples.

The multi-speed transmission 145 includes the planetary gear set 150 which is illustrated as a simple planetary gear set. Using a simple planetary gear set in conjunction with the parallel motor arrangement allows an upper portion of the multi-speed electric drive unit 102 to achieve a desired profile which is capable of integration into a wider variety of vehicle platforms, such as loaders and trucks, for instance. However, the electric drive unit may be incorporated into many other types of vehicles, as indicated above. However, in alternate examples, the planetary gear set may be a multi-stage planetary gear set which may however decrease drive unit compactness and increases drive unit complexity.

The planetary gear set 150 includes a ring gear 154, planet gears 156 that rotate on a carrier 158, and a sun gear 160. Both the ring gear 154 and the sun gear 160 mesh with the planet gears 156.

The first clutch 146 is configured to rotationally couple the carrier 158 to the transmission shaft 128, when engaged and when disengaged enable the carrier to be decoupled from the transmission shaft 128. The second clutch 148 is configured to ground the ring gear 154 when engaged and allow rotation of the ring gear when disengaged. The ring gear 154 may specifically be grounded to a stationary component 162 (e.g., a housing) of the multi-speed electric drive unit 102.

Both the first and second clutches 146 and 148 are illustrated as friction clutches (e.g., wet friction clutches). Using friction clutches allows power interruptions during shifting transients to be reduced when compared to dog clutches, synchronizers, and the like. However, in other examples, the first and/or section clutch may include a dog clutch and/or a synchronizer.

The first clutch 146 includes multiple sets of plates 161 that are retained in different plate carriers 164 (e.g., a drum and a sleeve). One of the plate carriers 164 is fixedly coupled to the transmission shaft 128 via an extension 163 and the other plate carrier is fixedly coupled to the carrier 158 of the planetary gear set 150.

The second clutch 148 includes multiple sets of plates 165 one of which is coupled to the ring gear 154 via a plate carrier 166 that is mounted to a shaft 168 which is fixedly coupled to the ring gear. The other set of plates in the second clutch is coupled to the stationary component 162 via another plate carrier 170.

The multi-speed transmission 145 further includes an output gear 172. As described herein the input and output of the transmission are described with regard to the mechanical power flow through the transmission during a drive mode. However, it will be understood that when the electric drive unit is operated in a regeneration mode, mechanical power flows back through the transmission to the electric motors. The output gear 172 meshes with a gear 174 that is rotationally coupled (e.g., directly rotationally coupled) to the carrier 158 via a shaft 176. Directly coupling the output gear 172 to the gear 174 allows the transmission to achieve a desired drop that expands the drive unit's applicability. Further, the shaft 128 may be routed through a central opening 178 in the gear 174 and the shaft 176. In this way, the compactness of the transmission is further increased.

The output gear 172 is fixedly coupled to the shaft 152 (e.g., output shaft). The shaft 152 has mechanical interfaces 180, 182 (e.g., output interfaces) that are mounted thereto or formed thereon. The mechanical interfaces 180, 182 are designed to attach to axle assemblies 184 and 186 (e.g., front and rear axle assemblies), respectively, via shafts, coupling, chains, combinations thereof, and the like as denoted via arrows 187. The axle assemblies may each include components such as a differential, axle shafts, and drive wheels. As such, the multi-speed electric drive unit 102 may be desired for a four-wheel drive vehicle. The mechanical interfaces 180, 182 are specifically illustrated as flanges. However, other suitable types of mechanical interfaces have been contemplated such as yokes, splines, joints, combinations thereof, and the like.

The multi-speed electric drive unit 102 further includes a dry sump 183 in the illustrated example. However, in alternate examples, the dry sump may be omitted from the drive unit. The dry sump 183 includes a scavenger pump 185 with a pick-up 187 at a vertical low point 189 in the housing. The scavenger pump 185 routes lubricant (e.g., oil) to lubrication system components. For instance, the scavenger pump may route lubricant to jets or other components that facilitate lubrication of the gears, bearings, etc. in the transmission.

The EV 100 and specifically the multi-speed electric drive unit 102 further includes a control system 190 with a controller 192 as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 192 may receive various signals from sensors 195 coupled to various regions of the EV 100, the multi-speed electric drive unit 102, and the multi-speed transmission 145. For example, the sensors 195 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the electric motor. An input device 197 (e.g., accelerator pedal, brake pedal, drive mode selector, combinations thereof, and the like) may further provide input signals indicative of an operator's intent for vehicle control.

Upon receiving the signals from the various sensors 195 of FIG. 1, the controller 192 processes the received signals, and employs various actuators 196 of vehicle components to adjust the components based on the received signals and instructions stored on the memory of controller 192. For example, the controller 192 may receive an accelerator pedal signal indicative of an operator's request for increased vehicle acceleration. In response, the controller 192 may command operation of the inverters 134, 136, and/or 140 to adjust electric motor power output and increase the power delivered from the motors 110, 112, and/or 114, respectively, to the multi-speed transmission 145. The controller 192 may, during certain operating conditions, be designed to send commands to the clutches 146, 148, to engage and disengage the clutches. For instance, a control command may be sent to the clutch 146 and in response to receiving the command, an actuator in the clutch may adjust the clutch based on the command for clutch engagement or disengagement. The other controllable components in the vehicle may function in a similar manner with regard to sensor signals, control commands, and actuator adjustment, for example.

An axis system is provided in FIG. 1 as well as FIGS. 2A, 2B, 3, 4, and 5, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIGS. 2A and 2B show mechanical power paths 200 and 202 through the multi-speed electric drive unit 102 in a lower speed mode (e.g., first gear mode) and a higher speed mode (e.g., second gear mode), respectively. It will be appreciated that the control system 190 may be used to transition between these modes. Redundant description of the control system and electric drive unit componentry is omitted for brevity, although the components are similarly numbered. The gear ratio of the transmission in the lower speed mode is higher than the gear ratio in the higher speed mode. As such, the lower speed mode may be used during lower speed vehicle operation and the higher speed mode may be used during higher speed vehicle operation. It will be understood that these mechanical power paths may correspond to both forward and reverse drive modes. Further, the electric motors may generate rotational output in opposite directions in the forward and reverse drive modes. In other words, in a forward drive mode, the first electric motor may rotate the shaft 118 in a first direction and in a reverse drive mode, it may rotate the shaft 118 in the opposite direction. Thus, the mechanical power paths shown in FIGS. 2A and 2B generally correspond to drive mode operation. Additionally, in FIGS. 2A and 2B, the first electric motor 110, the second electric motor 112, and the third electric motor 114 are operating to generate mechanical power output. As such, the inverters 134, 136, and 140 may be operated to transfer electrical energy from the energy storage device(s) 132 to the corresponding electric motor. However, in alternate examples, only a portion of the motors may be operational. For instance, the third motor may not be operational or may be omitted from the electric drive unit, in some examples.

As illustrated in FIG. 2A, while the multi-speed electric drive unit 102 is operating in the lower speed mode, the first clutch 146 is disengaged and the second clutch 148 is engaged. The mechanical power path 200 unfolds as follows: mechanical power moves from the first and second electric motors 112, 114 to the gear 116 and from the third electric motor 114 to the gear 144; from the gears 116 and 144 to the sun gear 160; from the sun gear 160 to the carrier 158 via the planet gears 156; from the carrier 158 to the gear 174; from the gear 174 to the gear 172; from the gear 172 to the shaft 152; and from the shaft 152 to the mechanical interfaces 180 and 182. From the mechanical interfaces power travels to downstream components in the axle assemblies 184 and 186 and finally to drive wheels.

As illustrated in FIG. 2B, while the multi-speed electric drive unit 102 is operating in the higher speed mode, the first clutch 146 is engaged and the second clutch 148 is disengaged. The mechanical power path 202 unfolds as follows: mechanical power moves from the first and second electric motors 112, 114 to the gear 116 and from the third electric motor 114 to the gear 144; from the gears 116 and 144 to the extension 163; from the extension 163 to the first clutch 146; from the first clutch 146 to the carrier 158; from the carrier 158 to the gear 174; from the gear 174 to the gear 172; from the gear 172 to the shaft 152; and from the shaft 152 to the mechanical interfaces 180 and 182. From the mechanical interfaces power travels to downstream components in the axle assemblies 184 and 186 and finally to drive wheels.

FIG. 2C shows a table 250 that indicates the configurations of the first clutch 146 and the second clutch 148 in the lower speed mode and the higher speed mode. As previously indicated, in the lower speed mode, the clutch 148 is engaged and the clutch 146 is disengaged and conversely, in the second gear mode the clutch 148 is disengaged and the clutch 146 is engaged. The lower speed mode has a higher gear ratio than the higher speed mode. Therefore, the lower speed mode (e.g., first gear mode) may be used during launch and lower speed vehicle travel and the higher gear mode (e.g., second gear mode) may be used during higher speed vehicle travel.

FIGS. 3-5 show an example of a multi-speed electric drive unit 300. Turning specifically to FIG. 3, the multi-speed electric drive unit 300 is shown including a first electric motor 302 (e.g., a traction motor such as a traction motor-generator) and a second electric motor 304 (e.g., a traction motor such as a traction motor generator) along with a housing 306 that encloses a multi-speed transmission 307, shown in FIG. 5. Although, the electric drive unit is shown with two traction motors, a third traction motor may be used in the electric drive unit in alternate designs.

As illustrated in FIG. 3, the rotational axes 308, 310 of the first electric motor 302 and the second electric motor 304 are parallel to one another. To elaborate, the electric motors 302, 304 have a substantially equivalent height with regard to the vertical axis. Positioning the motors in this manner allows the drive unit to be incorporated into space constrain vehicle platforms.

The housing 306 may be conceptually divided into different sections. To elaborate, the housing includes an upper section 312 with motor interfaces 313 on one side 314 and a transmission enclosure 316 on the other side 318. In this way, the drive unit may achieve enhanced mass balance.

A mechanical interface 320 which is configured to rotationally attach to a drive axle assembly is shown positioned in a lower section 322 of the housing 306. The lower section 322 of the housing has a smaller width 324 than the width 326 of the upper section 312. Designing the transmission with this width variance allows the transmission to be more effectively incorporated into space constrained vehicle platforms, such as loader type vehicles, in one use-case example. FIG. 3 further shows the drop 328 of the transmission 307.

FIG. 4 shows another view of the multi-speed electric drive unit 300 with the electric motors 302 and 304 as well as the housing 306. The other mechanical interface 400 at the transmission's output is illustrated in FIG. 4. The mechanical interface 400 is configured to rotationally attach to another drive axle assembly. The upper housing section 312 with the transmission enclosure 316 and the lower housing section 322 are again shown. The transmission enclosure 316 has a cylindrical shape, in the illustrated example. However, the transmission enclosure may have an alternate contour, in other examples. For instance, the transmission enclosure may include multiple planar sides, in other examples. A cutting plane 5-5' is illustrated in FIG. 4 which indicates the cross-sectional view depicted in FIG. 5.

FIG. 5 shows a cross-sectional view of the multi-speed electric drive unit 300 with the transmission 307. It will be understood that the transmission 307 shown in FIG. 5 and the transmission 145 shown in FIG. 1 have similar architectures with regard to the number of clutches, planetary gear set layout, shaft locations, etc.

A transmission shaft 500 (e.g., idler shaft) and an output shaft 502 are specifically depicted in FIG. 5. An output gear 504 is fixedly coupled or otherwise integrally formed with the output shaft 502. Bearings 506 are positioned on opposing sides of the output gear 504 and the mechanical interfaces 320 and 400 are positioned on opposing axial ends 508 of the output shaft 502, in the illustrated example. The output assembly 510 may solely include the output gear 504, the bearings 506, the output shaft 502, and the mechanical interfaces 320, 400, in one example, to decrease the width of the lower section 322 of the housing 306. In this way, the transmission is capable of being incorporated into a space constrained environment. The upper section 312 of the housing 306, and specifically the enclosure 316, is shown containing the multi-speed transmission 307.

A clutch 512 (e.g., a friction clutch) in the multi-speed transmission 307 is further shown in FIG. 5. The clutch 512 is configured to selectively couple an extension 514 that is fixedly coupled to the shaft 500 to a carrier 516 in a planetary gear set 518.

Another clutch 520 (e.g., friction clutch) is illustrated in FIG. 5. The clutch 520 is configured to selectively brake a ring gear 522 in the planetary gear set 518 via a ring gear extension 523. The ring gear extension 523 may at least partially circumferentially enclose the clutch 512, to increase transmission compactness. However, alternate clutch extension profiles may be used in other examples.

As shown, the clutch 512 and the clutch 520 are coaxially arranged. This coaxial clutch arrangement enables the compactness of the transmission to be increased.

Consequently, the electric transmission may be used in space constrained vehicle platforms, such as a loader type vehicle, in one specific use-case example. The planetary gear set 518 further includes a sun gear 521 and planet gears 524 that rotate on the carrier 516.

The output gear 504 meshes with a gear 526 that is rotationally coupled to the carrier 516 via an extension 527. The multi-speed transmission 307 further includes an input gear 528 that meshes with a gear 530 which is coupled to the electric motor 304 via a shaft 532. The electric motor 304, shown in FIG. 4, may be coupled to the input gear 528 in a similar manner. In the illustrated example, the gear 526 is positioned axially between the input gear 528 and the clutches 512 and 520. In this way, the compactness of the electric transmission is increased. However, the gear may be positioned in other suitable locations, in alternate transmission architectures.

As illustrated in FIG. 5, bearings 534 are coupled to opposing ends of the shaft 500. Further, bearings 536 are coupled to the ring gear extension 523 and the shaft 500. Bearings 538 are shown coupled to the clutch extension 540. However, alternate bearing arrangements in the transmission have been contemplated.

FIG. 5 further shows the drop 328 of the transmission along with a length 542 of the output shaft 502 which may be indicative of an output flange-to-flange distance of the transmission. The electric multi-speed transmission 307 achieves a comparatively long drop and short output flange-to-flange distance which may be particularly desirable in loader type vehicles. However, as previously discussed, the electric drive unit may be used in a variety of vehicle types.

The multi-speed electric drive unit 300 may further include a scavenger pump 550 with a pick-up 552 positioned at a low point of a sump 554 in the housing 306. In this way, transmission efficiency is decreased by decreasing churning losses. However, in other examples, the transmission may include a wet sump which provides splash lubrication to the gears, bearings, and/or clutches in the transmission.

The rotational axis 560 of the shaft 500 and the rotational axis 562 of the shaft 502 along with the rotational axis 310 of the electric motor 304 are provided for reference in FIG. 5. These rotational axes are parallel to one another, in the illustrated example. However, at least a portion of the axes may have other orientations, in alternate examples.

FIG. 6 shows a method 600 for operation of an electric drive unit. The method 600 may be carried out by any of the electric drive units or combinations of the electric drive units described herein with regard to FIGS. 1-5, in one example. In other examples, the method 600 may be implemented by other suitable electric drive units. Furthermore, the method 600 may be implemented by a controller that includes memory holding instructions for the method steps that are executable by a processor, as previously indicated.

The method 600 illustrated in FIG. 6 includes at 602, determining operating conditions. The operating conditions may include input device position (e.g., gearshift lever position), clutch configuration, accelerator pedal position, transmission input/output speed, motor speed, vehicle speed, vehicle load, ambient temperature, and the like. The operating conditions may be ascertained via sensor inputs, modeling, look-up tables, and/or other suitable techniques.

Next at 604, the method includes judging if the electric multi-speed transmission should be powershifted. Such as determination may be carried out responsive to vehicle speed surpassing a threshold value, in one example. In other examples, operator interaction with gear selector may initiate powershift operation.

If it is determined that a powershift should not occur (NO at 604) the method moves to 606 where the method includes sustaining the transmission's current operating strategy. For instance, the transmission may be maintained in a lower gear or a higher gear.

Conversely, if it is determined that a powershift should occur (YES at 604) the method moves to 608 where the method includes engaging a first clutch while disengaging a second clutch while power delivery from the electric motors to the transmission is sustained to transition from a lower gear to a higher gear. In this way, the shift may occur with little or no power interruption, if wanted. It will be appreciated that the power shift may occur from the higher-speed mode to the lower-speed mode in a similar manner.

The technical effect of the electric drive unit operating methods described herein is to provide an electric drive unit with multiple selectable gears that achieve a target compactness and transmission drop that enables the drive unit to be packaged in space constrained vehicle platforms.

FIGS. 1-2B and 3-5 show example component configurations with relative positioning of the various components. If elements are shown directly contacting each other, or directly coupled to one another, then such elements may be referred to as directly contacting or directly coupled to one another, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such. Still further, an axis about which a component rotates may be referred to as a rotational axis.

The invention will be further described in the following paragraphs. In one aspect, a multi-speed electric drive unit is provided that comprises a first electric motor and a second electric motor arranged parallel to each other and rotationally coupled to a first input gear that is fixedly coupled to a first transmission shaft; a first clutch arranged coaxial to a second clutch; wherein the first clutch selectively rotationally couples a carrier of a planetary gear set to the first transmission shaft; wherein the second clutch selectively brakes a ring gear of the planetary gear set; and a second transmission shaft with an output gear rotationally coupled thereto and including a first and second mechanical interface that are configured to rotationally couple to a first drive axle assembly and a second drive axle assembly; and wherein the output gear meshes with a gear that is directly rotationally coupled to the carrier.

In another aspect, a method for operation of an electric drive unit is provided that comprises: powershifting between a lower speed mode and a higher speed mode via engagement of a first friction clutch and disengagement of a second friction clutch or vice versa; wherein the electric drive unit includes: a first traction motor and a second traction motor arranged parallel to each other and rotationally coupled to a first input gear that is fixedly coupled to a first transmission shaft; the first friction clutch which is arranged coaxial to the second friction clutch; and a second transmission shaft with an output gear rotationally coupled thereto and including a first and second mechanical interface configured to rotationally couple to a first drive axle assembly and a second drive axle assembly; wherein the output gear meshes with a gear that is directly rotationally coupled to the carrier. Further in one example, wherein the electric drive unit may further include a third traction motor rotationally coupled to a second input gear that is fixedly coupled to the first transmission shaft and wherein the method may further comprise concurrently operating the first, second, and third traction motors during the powershift between the lower speed mode and the higher speed mode.

In yet another aspect, a two-speed electric drive unit is provided that comprises a first traction motor and a second traction motor arranged parallel to each other and each rotationally coupled to an input gear fixedly coupled to a first transmission shaft; and an electric transmission including: a first friction clutch arranged coaxial to a second friction clutch; wherein the first friction clutch selectively rotationally couples a carrier of a planetary gear set to the first transmission shaft; wherein the second friction clutch selectively brakes a ring gear of the planetary gear set; and a second transmission shaft with an output gear rotationally coupled thereto and including a first and second mechanical interface configured to rotationally couple to a first drive axle assembly and a second drive axle assembly, respectively; wherein the output gear meshes with a gear directly rotationally coupled to the carrier.

In any of the aspects or combinations of the aspects, the output gear may be positioned axially between the first input gear and the first and second clutches.

In any of the aspects or combinations of the aspects, the electric drive unit may further comprise a third electric motor rotationally coupled to a second input gear that is fixedly coupled to the first transmission shaft.

In any of the aspects or combinations of the aspects, the first input gear and the second input gear may be positioned on opposing ends of the first transmission shaft.

In any of the aspects or combinations of the aspects, the first and second clutches may be friction clutches.

In any of the aspects or combinations of the aspects, the first and second electric motors may be positioned on a first longitudinal side of the electric drive unit and the first and second clutches may be positioned on a second longitudinal side of the electric drive unit that opposes the first longitudinal side.

In any of the aspects or combinations of the aspects, an output shaft assembly may solely include the output shaft, the first mechanical interface, the second mechanical interface, the output gear, and two bearings positioned on opposing sides of the output gear.

In any of the aspects or combinations of the aspects, the first electric motor and the second electric motor may have an equivalent vertical height in a housing of the multi-speed electric drive unit.

In any of the aspects or combinations of the aspects, the planetary gear set may be a simple planetary gear set.

In any of the aspects or combinations of the aspects, the electric drive unit may further comprise a scavenger pump with a pick-up positioned at vertical low point of a housing.

In any of the aspects or combinations of the aspects, the first and second electric motors may be multi-phase alternating current (AC) motors.

In any of the aspects or combinations of the aspects, the electric drive unit may be included in an all-electric vehicle.

In any of the aspects or combinations of the aspects, the electric drive unit may be included in a loader type vehicle.

In any of the aspects or combinations of the aspects, the first friction clutch, when engaged, may rotationally couple a carrier in a planetary gear set to the first transmission shaft; and the second friction clutch, when engaged, may brake a ring gear of the planetary gear set.

In any of the aspects or combinations of the aspects, the electric drive unit may further comprise a third traction motor rotationally coupled to a second input gear that is fixedly coupled to the first transmission shaft; wherein the output gear may be positioned axially between the first input gear and the first and second friction clutches; and wherein the first input gear and the second input gear may be positioned on opposing ends of the first transmission shaft.

In any of the aspects or combinations of the aspects, the third traction motor may have a lower vertical height than the first and second traction motors which have an equivalent height.

In any of the aspects or combinations of the aspects, the two-speed electric drive unit may be included in a loader vehicle that includes an adjustable front mounted bucket.

In any of the aspects or combinations of the aspects, the first traction motor and the second traction motor may each be coupled to the first input gear via a gear that rotates on a shaft which is directly rotationally coupled to a rotor shaft in the corresponding traction motor.

In any of the aspects or combinations of the aspects, the first and second friction clutches may be enclosed in a housing and wherein the housing includes a dry sump.

In another representation, a multi-motor electric vehicle system is provided that comprises two electric machines with parallel rotational axes and are positioned on one side of a transmission housing and a two-speed gearbox on an opposing side of the transmission housing, wherein the two-speed gearbox includes a carrier that is directly coupled to an output gear that rotates on an output shaft and includes a front drive axle interface and rear drive axle interface.

In yet another representation, an electric transmission is provided that includes two motor-generators positioned at an equivalent height, a dual-speed gear assembly with a first and second wet friction clutch that are positioned coaxial to one another and a simple planetary gear set with a carrier that is directly coupled to an output gear.

In any of the aspects or combinations of the aspects, where the first and second drive axle assemblies are front and rear drive axle assemblies.

Note that the example control and estimation routines included herein can be used with various system (e.g., powertrain) configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the vehicle and/or powertrain control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of traction motors, internal combustion engines in some instances, transmissions, and the like. The subject matter of the present disclosure includes all novel and non-obvious combinations and sub-combinations of the various systems and configurations, and other features, functions, and/or properties disclosed herein. Further, components that are The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed electric drive unit, comprising:
 a first electric motor and a second electric motor arranged parallel to each other and rotationally coupled to a first input gear that is fixedly coupled to a first transmission shaft;
 a first clutch arranged coaxial to a second clutch;
 wherein the first clutch selectively rotationally couples a carrier of a planetary gear set to the first transmission shaft;
 wherein the second clutch selectively brakes a ring gear of the planetary gear set; and
 a second transmission shaft with an output gear rotationally coupled thereto and including a first mechanical interface and a second mechanical interface that are configured to rotationally couple to a first drive axle assembly and a second drive axle assembly; and
 a third electric motor rotationally coupled to a second input gear that is fixedly coupled to the first transmission shaft;
 wherein the output gear meshes with a gear that is directly rotationally coupled to the carrier.

2. The multi-speed electric drive unit of claim 1, wherein the gear that is directly rotationally coupled to the carrier is positioned axially between the first input gear and the first and second clutches.

3. The multi-speed electric drive unit of claim 1, wherein the first input gear and the second input gear are positioned on opposing ends of the first transmission shaft.

4. The multi-speed electric drive unit of claim 1, wherein the first and second clutches are friction clutches.

5. The multi-speed electric drive unit of claim 1, wherein the first and second electric motors are positioned on a first longitudinal side of the multi-speed electric drive unit and the first and second clutches are positioned on a second longitudinal side of the multi-speed electric drive unit that opposes the first longitudinal side.

6. The multi-speed electric drive unit of claim 1, wherein an output shaft assembly solely includes the second transmission shaft, the first mechanical interface, the second mechanical interface, the output gear, and two bearings positioned on opposing sides of the output gear.

7. The multi-speed electric drive unit of claim 1, wherein the first electric motor and the second electric motor have an equivalent vertical height in a housing of the multi-speed electric drive unit.

8. The multi-speed electric drive unit of claim 1, wherein the planetary gear set is a simple planetary gear set.

9. The multi-speed electric drive unit of claim 1, further comprising a scavenger pump with a pick-up positioned at vertical low point of a housing.

10. The multi-speed electric drive unit of claim 1, wherein the first and second electric motors are multi-phase alternating current (AC) motors.

11. A method for operation of an electric drive unit, comprising:
    powershifting between a lower speed mode and a higher speed mode via engagement of a first friction clutch and disengagement of a second friction clutch or vice versa;
    wherein the electric drive unit includes:
        a first traction motor and a second traction motor arranged parallel to each other and rotationally coupled to a first input gear that is fixedly coupled to a first transmission shaft;
        the first friction clutch which is arranged coaxial to the second friction clutch; and
        a second transmission shaft with an output gear rotationally coupled thereto and including a first mechanical interface and second mechanical interface configured to rotationally couple to a first drive axle assembly and a second drive axle assembly; and
        includes a third traction motor rotationally coupled to a second input gear that is fixedly coupled to the first transmission shaft;
    wherein the output gear meshes with a gear that is directly rotationally coupled to a carrier of a planetary gear set; and
    concurrently operating the first, second, and third traction motors during the powershift between the lower speed mode and the higher speed mode.

12. The method of claim 11, wherein:
    the first friction clutch, when engaged, rotationally couples the carrier of the planetary gear set to the first transmission shaft; and
    the second friction clutch, when engaged, brakes a ring gear of the planetary gear set.

13. A two-speed electric drive unit, comprising:
    a first traction motor and a second traction motor arranged parallel to each other and each rotationally coupled to a first input gear fixedly coupled to a first transmission shaft; and
    an electric transmission including:
        a first friction clutch arranged coaxial to a second friction clutch;
        wherein the first friction clutch selectively rotationally couples a carrier of a planetary gear set to the first transmission shaft;
        wherein the second friction clutch selectively brakes a ring gear of the planetary gear set; and
        a second transmission shaft with an output gear rotationally coupled thereto and including a first and second mechanical interface configured to rotationally couple to a first drive axle assembly and a second drive axle assembly, respectively; and
        a third traction motor rotationally coupled to a second input gear that is fixedly coupled to the first transmission shaft;
        wherein the output gear is positioned axially between the first input gear and the first and second friction clutches;
        wherein the first input gear and the second input gear are positioned on opposing ends of the first transmission shaft; and
        wherein the output gear meshes with a gear that is directly rotationally coupled to the carrier.

14. The two-speed electric drive unit of claim 13, wherein the third traction motor has a lower vertical height than the first and second traction motors which have an equivalent height.

15. The two-speed electric drive unit of claim 13, wherein the first and second friction clutches are enclosed in a housing and wherein the housing includes a dry sump.

* * * * *